(12) United States Patent
Hatakeyama

(10) Patent No.: US 6,494,110 B2
(45) Date of Patent: Dec. 17, 2002

(54) FOUR PARALLEL SHAFT TYPE AUTOMATIC TRANSMISSION

(75) Inventor: Kazuma Hatakeyama, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/822,229

(22) Filed: Apr. 2, 2001

(65) Prior Publication Data

US 2001/0035060 A1 Nov. 1, 2001

(30) Foreign Application Priority Data

Apr. 4, 2000 (JP) ........................................ 2000-101802

(51) Int. Cl.[7] .............................................. F16H 3/093
(52) U.S. Cl. .......................................... 74/331; 74/329
(58) Field of Search ..................................... 74/331, 329

(56) References Cited

U.S. PATENT DOCUMENTS 2,825,232 A * 3/1958 Sieving et al. ................ 74/331
3,318,167 A * 5/1967 Frost ........................... 74/331
4,960,005 A * 10/1990 Kashiwase .................... 74/329
5,031,473 A * 7/1991 Yumoto et al. ................ 74/331
5,385,064 A * 1/1995 Reece .......................... 74/331
5,906,132 A * 5/1999 Janiszewski .................. 74/331

FOREIGN PATENT DOCUMENTS

JP            2900201         3/1999

* cited by examiner

Primary Examiner—Sherry Estremsky
(74) Attorney, Agent, or Firm—Armstrong, Westerman & Hattori, LLP

(57) ABSTRACT

In a four parallel shaft type automatic transmission, the driving force of a main shaft is transmitted to a first sub-shaft and a second sub-shaft via a gear train. A first speed clutch provided on the first sub-shaft and a fourth speed clutch and a fifth speed - reverse clutch provided on the main shaft on the left-hand side of the gear train are placed so that they are aligned in a direction perpendicular to the shafts, and a second speed clutch provided on the first sub-shaft and a third speed clutch provided on the second sub-shaft on the right-hand side of the gear train are placed so that they are aligned in a direction perpendicular to the shafts. Therefore, the overall axial length of the five clutches can be shortened so reducing the size of the automatic transmission.

5 Claims, 6 Drawing Sheets

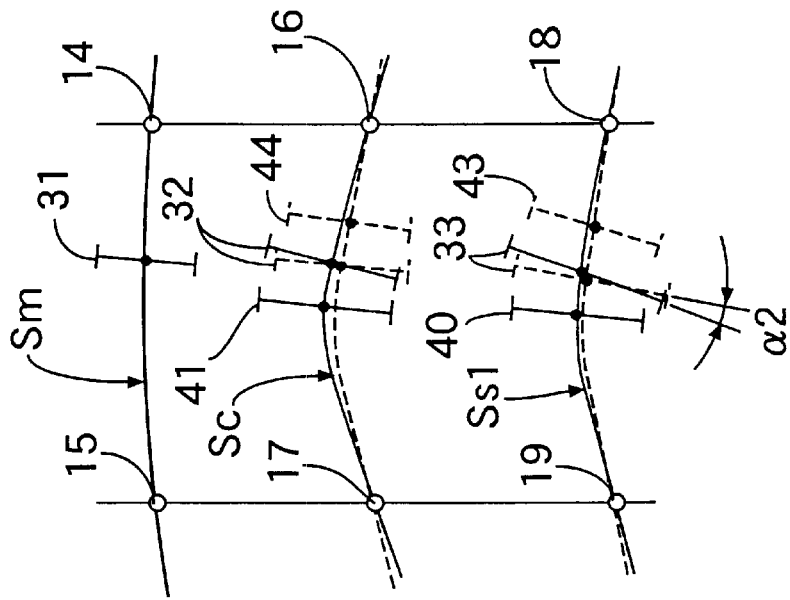
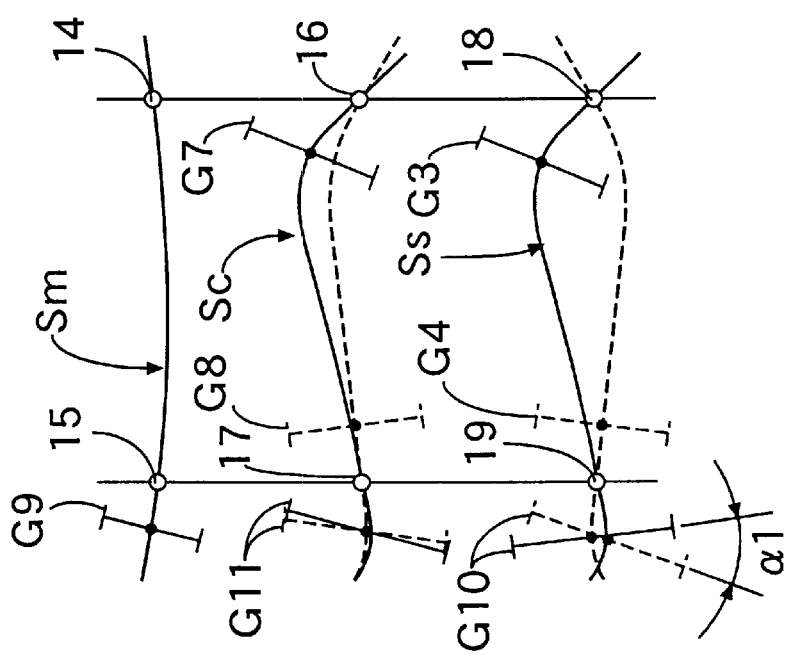

FOUR PARALLEL SHAFT TYPE AUTOMATIC TRANSMISSION

BACKGROUND OF THE INVENTION

1. Field of the Invention

The present invention relates to a four parallel shaft type automatic transmission comprising, in parallel, a main shaft, a counter shaft, a first sub-shaft and a second sub-shaft.

2. The Related Art

Japanese Patent Publication No. 2900201 discloses a three parallel shaft type automatic transmission for a vehicle which can establish five forward speed gear stages and one reverse gear stage.

FIG. 6 is a schematic diagram illustrating the above-mentioned three parallel shaft type automatic transmission of the art; this automatic transmission T comprises a main shaft Sm connected to an engine E via a torque converter 23, a counter shaft Sc and a secondary shaft Ss placed parallel to the main shaft Sm, and the rotation of the counter shaft Sc is transmitted to right and left driven wheels WR and WL via a differential gear box 25.

A first gear G1 and a second gear G2 are supported in a relatively rotatable manner on the main shaft Sm which is supported by means of a pair of bearings 14 and 15, and the first gear G1 and the second gear G2 are connected to the main shaft Sm via a fourth speed-reverse clutch C4R and a fifth clutch C5 respectively. The fourth speed-reverse clutch C4R and the fifth speed clutch C5 are provided back-to-back on an axially central part of the main shaft Sm. A ninth gear G9 for transmitting the forward driving force to the counter shaft Sc and the secondary shaft Ss is fixed on the main shaft Sm.

A third gear G3 and a fourth gear G4 are supported in a relatively rotatable manner on the secondary shaft Ss which is supported by means of a pair of bearings 18 and 19, and the third gear G3 and the fourth gear G4 are connected to the secondary shaft Ss via a first speed clutch C1 and a second speed clutch C2 respectively. The first speed clutch C1 and the second speed clutch C2 are provided back-to-back on an axially central part of the secondary shaft Ss. A tenth gear G10 is fixed on the secondary shaft Ss, and the forward driving force is transmitted from the main shaft Sm to the tenth gear G10.

A sixth gear G6 meshed with the second gear G2 of the main shaft Sm is fixed on the counter shaft Sc which is supported by means of a pair of bearings 16 and 17, and a seventh gear G7 and an eighth gear G8 meshed with the third gear G3 and the fourth gear G4 of the secondary shaft Ss respectively are also fixed on the counter shaft Sc. Furthermore, a fifth gear G5 meshed with the first gear G1 of the main shaft Sm is supported on the counter shaft Sc in a relatively rotatable manner, and the fifth gear G5 is connected to the counter shaft Sc via a chamfer 56. Moreover, an eleventh gear G11 meshed with both the ninth gear G9 of the main shaft Sm and the tenth gear G10 of the secondary shaft Ss is supported on the counter shaft Sc in a relatively rotatable manner, and the eleventh gear G11 is connected to the counter shaft Sc by means of a third speed clutch C3. The third speed clutch C3 is provided on the end of the counter shaft Sc opposite to the engine E.

A main reverse gear 51 formed integrally with the first gear G1 of the main shaft Sm is meshed with a counter reverse gear 54 supported on the counter shaft Sc via a reverse idler gear 55 in a relatively rotatable manner, and this counter reverse gear 54 is connected to the counter shaft Sc by means of the above-mentioned chamfer 56.

In accordance with the above-mentioned arrangement, when the first speed clutch C1 is engaged, the rotation of the main shaft Sm is transmitted to the counter shaft Sc via the ninth gear G9, the eleventh gear G11, the tenth gear G10, the secondary shaft Ss, the first speed clutch C1, the third gear G3 and the seventh gear G7 so establishing a first speed gear shift stage.

When the second speed clutch C2 is engaged, the rotation of the main shaft Sm is transmitted to the counter shaft Sc via the ninth gear G9, the eleventh gear G11, the tenth gear G10, the secondary shaft Ss, the second speed clutch C2, the fourth gear G4 and the eighth gear G8 so establishing a second speed gear shift stage.

When the third speed clutch C3 is engaged, the rotation of the main shaft Sm is transmitted to the counter shaft Sc via the ninth gear G9, the eleventh gear G11 and the third speed clutch C3 so establishing a third speed gear shift stage.

When the fourth speed-reverse clutch C4R is engaged, the rotation of the main shaft Sm is transmitted to the counter shaft Sc via the fourth speed-reverse clutch C4R, the first gear G1, the fifth gear G5 and the chamfer 56 so establishing a fourth speed gear shift stage.

When the fifth speed clutch C5 is engaged, the rotation of the main shaft Sm is transmitted to the counter shaft Sc via the fifth speed clutch C5, the second gear G2 and the sixth gear G6 so establishing a fifth speed gear shift stage.

When the counter reverse gear 54 is connected to the counter shaft Sc by means of the chamfer 56 in a state in which the fourth speed-reverse clutch C4R is engaged, the rotation of the main shaft Sm is transmitted as a reverse rotation to the counter shaft Sc via the fourth speed-reverse clutch C4R, the main reverse gear 51, the reverse idler gear 55, the counter reverse gear 54 and the chamfer 56 so establishing a reverse gear shift stage.

However, with regard to the conventional stepless transmission illustrated in FIG. 6, the third speed clutch C3 provided on the counter shaft Sc is placed on the end of the shaft opposite to the engine E, this third speed clutch C3 is not aligned with any of the other clutches in a direction perpendicular to the axial direction, and there is therefore the problem that the axial length of the automatic transmission increases by an amount corresponding to the distance the third speed clutch C3 projects in the axial direction.

SUMMARY OF THE INVENTION

The present invention has been carried out in view of the above-mentioned circumstances and it is an object of the present invention to reduce the axial length of the automatic transmission by efficiently arranging the gears and clutches used for establishing a plurality of gear shift stages.

In order to achieve the above-mentioned objective, in accordance with a first characteristic of the invention, there is proposed a four parallel shaft type automatic transmission comprising, in parallel, a main shaft, a counter shaft to which the rotation of the main shaft is directly transmitted via a first route, a first sub-shaft provided on a second route through which the rotation of the main shaft is transmitted to the counter shaft, and a second sub-shaft provided on a third route through which the rotation of the main shaft is transmitted to the counter shaft, wherein a first gear for transmitting the rotation of the main shaft to the counter shaft via the second route and a second gear for transmitting the rotation of the main shaft to the counter shaft via the first route are provided on the main shaft, a third gear and a fourth gear for transmitting the rotation of the main shaft to the counter shaft via the third route are provided on the second sub-shaft, the first gear and the third gear are provided within a first plane extending in a direction perpendicular to the shafts, and the second gear and the fourth gear are provided within a second plane extending in a direction perpendicular to the shafts.

In accordance with the above-mentioned arrangement, the first gear provided on the main shaft for transmitting the rotation of the main shaft to the counter shaft via the second route and the third gear provided on the second sub-shaft for transmitting the rotation of the main shaft to the counter shaft via the third route are provided within a first plane extending in a direction perpendicular to the shafts, and the second gear provided on the main shaft for transmitting the rotation of the main shaft to the counter shaft via the first route and the fourth gear supported on the second sub-shaft for transmitting the rotation of the main shaft to the counter shaft via the third route are provided within a second plane extending in a direction perpendicular to the shafts. Therefore, the first gear of the main shaft can be used for transmitting power via both the second route and the third route, and the second gear of the main shaft can be used for transmitting power via both the first route and the third route so reducing the number of gears and the axial length of the automatic transmission.

In accordance with a second characteristic of the invention, there is proposed a four parallel shaft type automatic transmission comprising, in parallel, a main shaft, a counter shaft to which the rotation of the main shaft is directly transmitted via a first route, a first sub-shaft provided on a second route through which the rotation of the main shaft is transmitted to the counter shaft, and a second sub-shaft provided on a third route through which the rotation of the main shaft is transmitted to the counter shaft, wherein a first gear for transmitting the rotation of the main shaft to the counter shaft via the second route and a second gear for transmitting the rotation of the main shaft to the counter shaft via the first route are provided on the main shaft, a third gear and a fourth gear for transmitting the rotation of the main shaft to the counter shaft via the third route are provided on the second sub-shaft, the first gear fixed to the main shaft is meshed with the third gear provided on the second sub-shaft in a manner such that the third gear can be freely engaged and disengaged, and the second gear provided on the main shaft in a manner such that the second gear can be freely engaged and disengaged is meshed with the fourth gear fixed on the second sub-shaft.

In accordance with the above-mentioned arrangement, in addition to the first characteristic of the invention, since the first gear fixed to the main shaft is meshed with the third gear provided on the second sub-shaft in a manner such that the third gear can be freely engaged and disengaged, and the second gear provided on the main shaft in a manner such that the second gear can be freely engaged and disengaged is meshed with the fourth gear fixed on the second sub-shaft, connecting the third gear to the second sub-shaft can establish a gear shift stage via the third route, and connecting the fourth gear to the main shaft can establish a gear shift stage via the first route.

In accordance with a third characteristic of the invention, in addition to the arrangement of the second characteristic, there is proposed a four parallel shaft type automatic transmission wherein the second gear provided on the main shaft in a manner such that the second gear can be freely engaged and disengaged is also used as an idler gear provided on the third route for transmitting the rotation of the main shaft to the counter shaft via the second sub-shaft.

In accordance with the above-mentioned arrangement, since the second gear provided on the main shaft in a manner such that the second gear can be freely engaged and disengaged is also used as an idler gear provided on the third route for transmitting the rotation of the main shaft to the counter shaft via the second sub-shaft, the number of gears can be further decreased so further reducing the axial length of the automatic transmission.

In accordance with a fourth characteristic of the invention, there is proposed a four parallel shaft type automatic transmission comprising, in parallel, a main shaft connected to an engine, a counter shaft connected to driven wheels, a first sub-shaft and a second sub-shaft to which the driving force of the main shaft is transmitted via a gear train, two low speed clutches for transmitting the rotation of the first sub-shaft to the counter shaft being provided on the first sub-shaft, a medium speed clutch for transmitting the rotation of the main shaft to the second sub-shaft being provided on the second sub-shaft, and high speed clutches for transmitting the rotation of the main shaft to the counter shaft being provided on the main shaft, wherein one of the low speed clutches and the high speed clutches are placed on one side of the gear train so that the low speed clutch and the high speed clutches are aligned with each other in a direction perpendicular to the shafts, and the other low speed clutch and the medium speed clutch are placed on the other side of the gear train so that the low speed clutch and the medium speed clutch are aligned with each other in a direction perpendicular to the shafts.

In accordance with the above-mentioned arrangement, the driving force of the main shaft is transmitted to the first sub-shaft and the second sub-shaft via the gear train, one of the two low speed clutches and the high speed clutches are placed on one side of the gear train so that the low speed clutch and the high speed clutches are aligned with each other in a direction perpendicular to the shafts, and the other low speed clutch and the medium speed clutch are placed on the other side of the gear train so that the low speed clutch and the medium speed clutch are aligned with each other in a direction perpendicular to the shafts. Therefore, the overall axial length of the low, medium and high speed clutches can be shortened so reducing the size of the automatic transmission.

In accordance with a fifth characteristic of the invention, in addition to the arrangement of the fourth characteristic, there is proposed a four parallel shaft type automatic transmission wherein a gear included in the gear train is placed on an almost central part of the first sub-shaft, the two ends of the first sub-shaft being supported by bearings, and a first speed gear for establishing a first speed gear shift stage and a second speed gear for establishing a second speed gear shift stage are placed on either side of the gear so as to adjoin it.

In accordance with the above-mentioned arrangement, when a first speed gear shift stage is established, the driving force is transmitted via the gear in the gear train placed on a substantially central part of the first sub-shaft, the two ends of the first sub-shaft being supported, and the first gear adjoining one side of the above-mentioned gear; when a second speed gear shift stage is established the driving force is transmitted via the gear in the above-mentioned gear train and the second gear adjoining the other side of the above-mentioned gear. Therefore, the curvature of the first sub-shaft accompanying the transmission of the driving force can be minimized so avoiding incomplete gear meshing and reducing the noise.

In accordance with a sixth characteristic of the invention, in addition to the arrangement of the fourth characteristic, there is proposed a four parallel shaft type automatic transmission wherein medium speed gears for transmitting the rotation of the second sub-shaft to the counter shaft by engagement of the medium speed clutch are also used as high speed gears for transmitting the rotation of the main shaft to the counter shaft by engagement of the high speed clutch.

In accordance with the above-mentioned arrangement, when the medium speed clutch is engaged, the rotation of the second sub-shaft is transmitted to the counter shaft via the medium speed gears, and when the high speed clutch is engaged, the rotation of the main shaft is transmitted to the counter shaft via the medium speed gears that are as the high speed gears. Therefore, the number of gears can be so contributing to a reduction in the size of the automatic transmission. The route for establishing the fourth speed gear shift stage, the fifth speed gear shift stage and the reverse gear shift stage in the embodiment corresponds to the first route in the present invention, the route for establishing the first speed gear shift stage and the second speed gear shift stage in the embodiment corresponds to the second route in the present invention, and the route for establishing the third speed gear shift stage in the embodiment corresponds to the third route in the present invention.

The sub-shaft drive first gear 31 in the embodiment corresponds to the first gear of the present invention, the main three speed-fourth speed gear 48 in the embodiment corresponds to the second gear of the present invention, the first sub second gear 43 in the embodiment corresponds to the third gear of the present invention, and the second sub third speed gear 46 in the embodiment corresponds to the fourth gear of the present invention.

The first speed clutch C1 and the second speed clutch C2 in the embodiment correspond to the low speed clutch of the present invention, the third speed clutch C3 in the embodiment corresponds to the medium speed clutch of the present invention, the fourth speed clutch C4 and the fifth speed-reverse clutch C5R in the embodiment correspond to high speed clutches of the present invention, the sub-shaft drive first gear 31 to the sub-shaft drive fourth gear 34 in the embodiment correspond to the gear train of the present invention, the first sub first speed gear 40 in the embodiment corresponds to the first speed gear of the present invention, the first sub second speed gear 43 in the embodiment corresponds to the second speed gear of the present invention, and the main third speed-fourth speed gear 48 and the counter third speed-fourth speed gear 52 in the embodiment correspond to the medium speed gear and the high speed gear of the present invention.

The practical modes of the present invention are described below by reference to an embodiment of the present invention shown in the attached drawings.

BRIEF DESCRIPTION OF DRAWINGS

FIGS. 5A and 5B are diagrams for explaining the action of the four parallel shaft type automatic transmission.

DETAILED DESCRIPTION OF THE EMBODIMENT OF THE INVENTION

Figure 1:
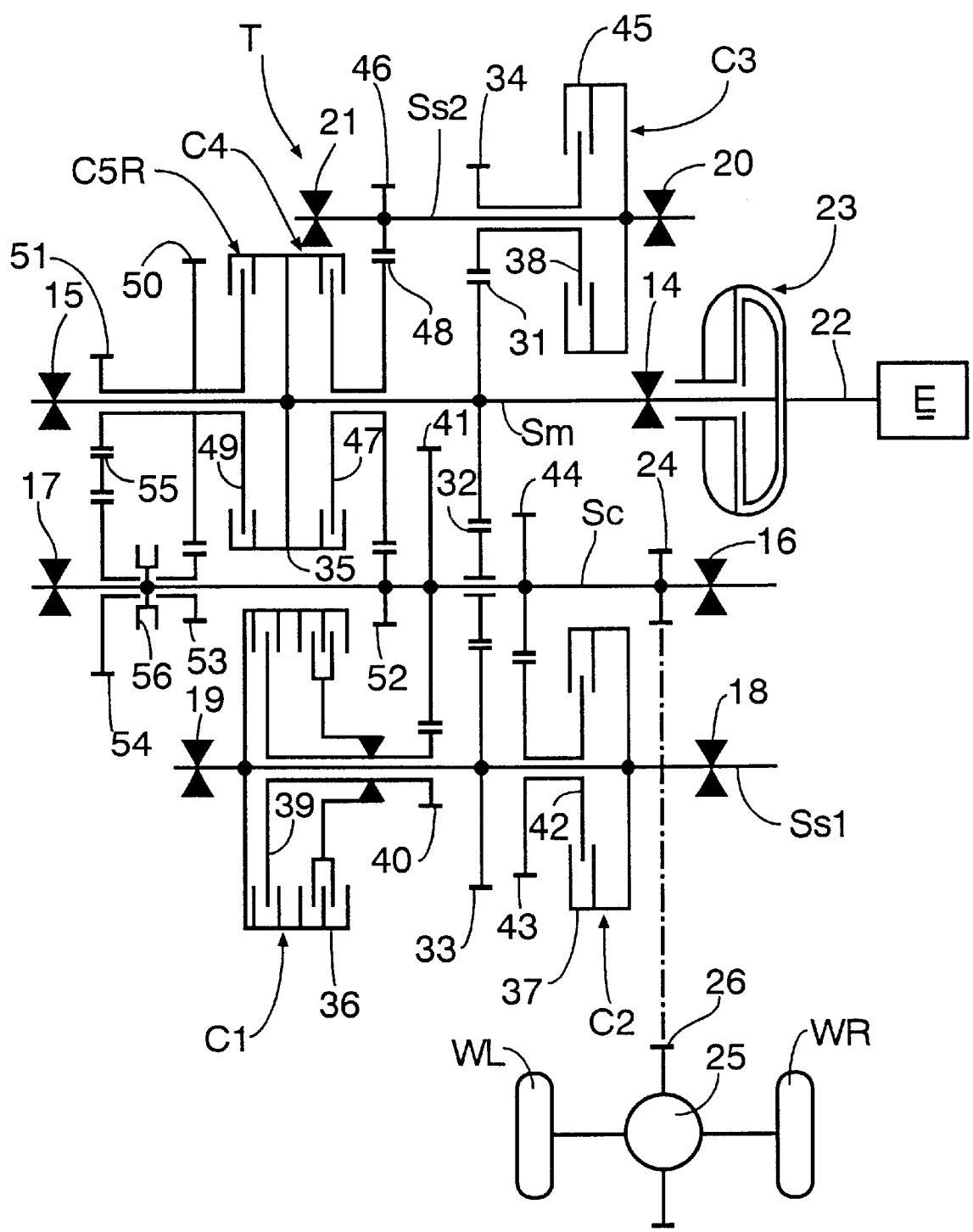
FIG. 1 is a schematic diagram showing a four parallel shaft type automatic transmission.
Figure 2:
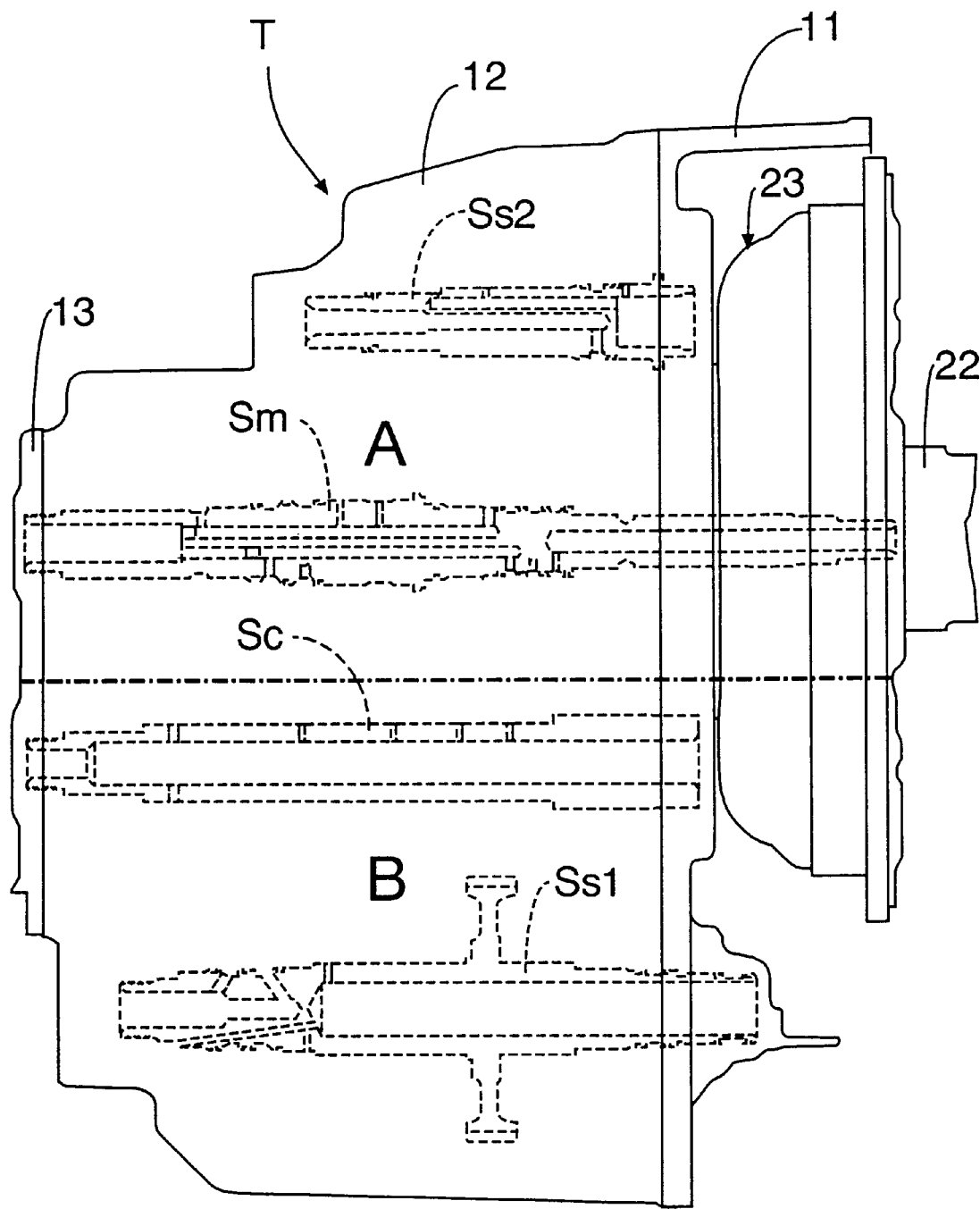
FIG. 2 is a map showing the positions of FIGS. 3 and 4.
Figure 3:
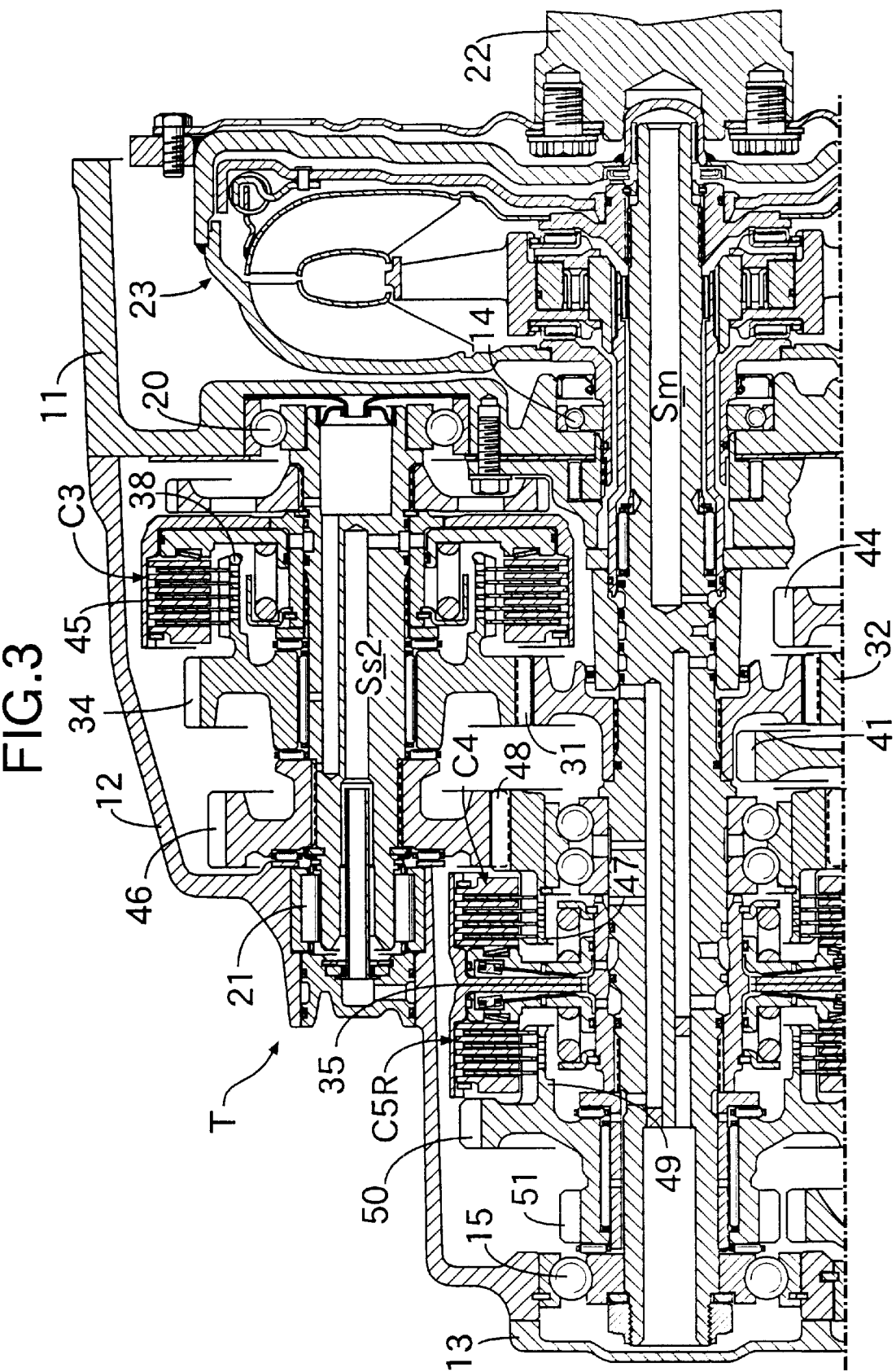
FIG. 3 is a detailed diagram of section A in FIG. 2.
Figure 4:
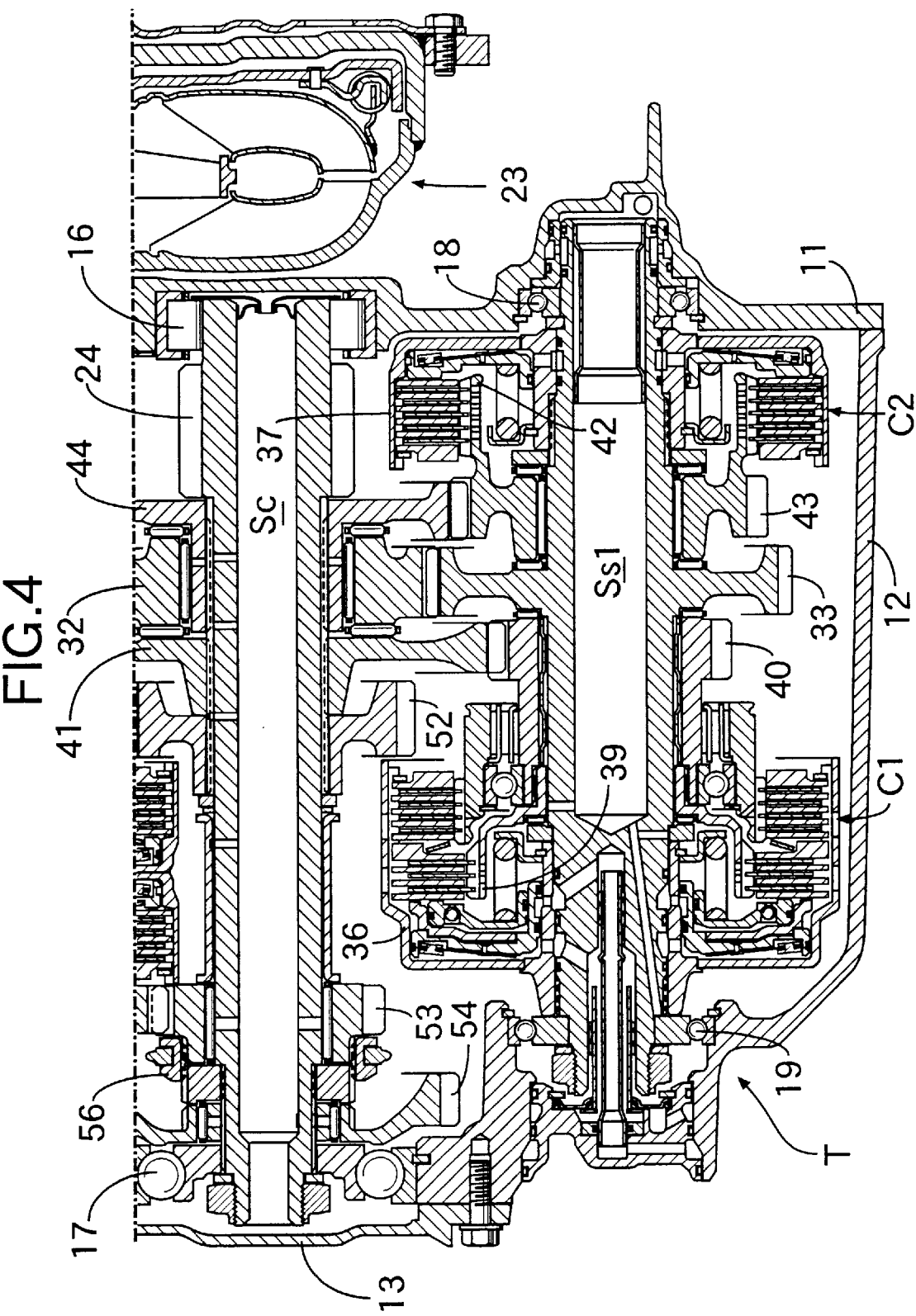
FIG. 4 is a detailed diagram of section B in FIG. 2.

FIGS. 1 to 4 and 5=billustrate one embodiment of the present invention.

The outer periphery of a four parallel shaft type automatic transmission T connected to the left-hand side face of an engine E comprises a torque converter case 11, a transmission case 12 and a case cover 13. In the torque converter case 11 and the transmission case 12, a main shaft Sm is supported by means of ball bearings 14 and 15, a counter shaft Sc is supported by means of a roller bearing 16 and a ball bearing 17, a first sub-shaft Ss1 is supported by means of ball bearings 18 and 19, and a second sub-shaft Ss2 is supported by means of a ball bearing 20 and a roller bearing 21. The main shaft Sm is connected to a crankshaft 22 of the engine E via a torque converter 23. A final drive gear 24 integral with the counter shaft Sc is meshed with a final driven gear 26 fixed on the outer periphery of a differential gear box 25 so as to drive right and left driven wheels WR and WL.

In order to establish a first speed gear shift stage to a fifth speed gear stage and a reverse gear shift stage by transmitting the rotation of the main shaft Sm to the counter shaft Sc at the respective gear ratios, a first speed clutch C1 and a second speed clutch C2 are provided on the first sub-shaft Ss1, a third speed clutch C3 is provided on the second sub-shaft Ss2, and a fourth speed clutch C4 and a fifth speed-reverse clutch C5R are provided on the main shaft Sm. A sub-shaft drive first gear 31 integral with the main shaft Sm is meshed with a sub-shaft drive second gear 32 supported on the counter shaft Sc in a relatively rotatable manner, this sub-shaft drive second gear 32 is meshed with a sub-shaft drive third gear 33 integral with the first sub-shaft Ss1, and the above-mentioned sub-shaft drive first gear 31 is meshed with a sub-shaft drive fourth gear 34 supported on the second sub-shaft Ss2 in a relatively rotatable manner.

Even when the first speed clutch C1 to the fifth speed-reverse clutch C5R are in a disengaged state, each of the parts explained below always rotates as a result of being operable in association with the rotation of the main shaft Sm. That is to say, the sub-shaft drive first gear 31 that is integral with the main shaft Sm and a common clutch outer 35 for the fourth speed clutch C4 and the fifth speed-reverse clutch C5R that is integral with the main shaft Sm always rotate, and the sub-shaft drive second gear 32 of the counter shaft Sc that is meshed with the sub-shaft drive first gear 31 of the main sub-shaft Sm always rotates. The first sub-shaft Ss1 having the integral sub-shaft drive third gear 33 meshed with the above-mentioned sub-shaft drive second gear 32 always rotates, and the clutch outers 36 and 37 of the first speed clutch C1 and the second speed clutch C2 provided on this first sub-shaft Ss1 also always rotate. The sub-shaft drive fourth gear 34 supported on the second sub-shaft Ss2 in a relatively rotatable manner and meshed with the sub-shaft drive first gear 31, and a clutch inner 38 of the third speed clutch C3 connected integrally to this sub-shaft drive fourth gear 34 also always rotate.

A first sub first speed gear 40 integral with a clutch inner 39 of the first speed clutch C1 provided on the first sub-shaft Ss1 is meshed with a counter first speed gear 41 integral with the counter shaft Sc. A first sub second speed gear 43 integral with a clutch inner 42 of the second speed clutch C2 provided on the first sub-shaft Ss1 is meshed with a counter second speed gear 44 integral with the counter shaft Sc. A clutch outer 45 of the third speed clutch C3 and a second sub third speed gear 46 are integrally provided on the second sub-shaft Ss2. A main third speed-fourth speed gear 48 integral with a clutch inner 47 of the fourth speed clutch C4 provided on the main shaft Sm is meshed with the above-mentioned second sub third speed gear 46 integral with the second sub-shaft Ss2. A main fifth speed gear 50 and a main reverse gear 51 are provided integrally with a clutch inner 49 of the fifth speed-reverse clutch C5R provided on the main shaft Sm.

A counter third speed-fourth speed gear 52 integral with the counter shaft Sc is meshed with the above-mentioned main third speed-fourth speed gear 48. A counter fifth speed gear 53 and a counter reverse gear 54 are supported on the counter shaft Sc in a relatively rotatable manner, the counter fifth speed gear 53 is meshed with the above-mentioned main fifth speed gear 50, and the counter reverse gear 54 is meshed with the above-mentioned main reverse gear 51 via a reverse idler gear 55 (see FIG. 1). The counter fifth speed gear 53 and the counter reverse gear 54 on the counter shaft Sc can be selectively connected to the counter shaft Sc by means of a chamfer 56.

When the first speed clutch C1 is engaged so as to establish a first speed gear shift stage, the rotation of the main shaft Sm is transmitted to the driven wheels WR and WL through the sub-shaft drive first gear 31, the sub-shaft drive second gear 32, the sub-shaft drive third gear 33, the first sub-shaft Ss1, the clutch outer 36 and the clutch inner 39 of the first speed clutch C1, the first sub first speed gear 40, the counter first speed gear 41, the counter shaft Sc, the final drive gear 24, the final driven gear 26 and the differential gear box 25.

When the second speed clutch C2 is engaged so as to establish a second speed gear shift stage, the rotation of the main shaft Sm is transmitted to the driven wheels WR and WL through the sub-shaft drive first gear 31, the sub-shaft drive second gear 32, the sub-shaft drive third gear 33, the first sub-shaft Ss1, the clutch outer 37 and the clutch inner 42 of the second speed clutch C2, the first sub second speed gear 43, the counter second speed gear 44, the counter shaft Sc, the final drive gear 24, the final driven gear 26 and the differential gear box 25.

When the third speed clutch C3 is engaged so as to establish a third speed gear shift stage, the rotation of the main shaft Sm is transmitted to the driven wheels WR and WL through the sub-shaft drive first gear 31, the sub-shaft drive fourth gear 34, the clutch inner 38 and the clutch outer 45 of the third speed clutch C3, the second sub-shaft Ss2, the second sub third speed gear 46, the main third speed-fourth speed gear 48, the counter third speed-fourth speed gear 52, the counter shaft Sc, the final drive gear 24, the final driven gear 26 and the differential gear box 25.

When the fourth speed clutch C4 is engaged so as to establish a fourth speed gear shift stage, the rotation of the main shaft Sm is transmitted to the driven wheels WR and WL through the clutch outer 35 and the clutch inner 47 of the fourth speed clutch C4, the main third speed-fourth speed gear 48, the counter third speed-fourth speed gear 52, the counter shaft Sc, the final drive gear 24, the final driven gear 26 and the differential gear box 25.

When the fifth speed-reverse clutch C5R is engaged so as to establish a fifth speed gear shift stage in a state in which the counter fifth speed gear 53 is connected to the counter shaft Sc by means of the chamfer 56, the rotation of the main shaft Sm is transmitted to the driven wheels WR and WL through the clutch outer 35 and the clutch inner 49 of the fifth speed-reverse clutch C5R, the main fifth speed gear 50, the counter fifth speed gear 53, the counter shaft Sc, the final drive gear 24, the final driven gear 26 and the differential gear box 25.

When the fifth speed-reverse clutch C5R is engaged so as to establish a reverse gear shift stage in a state in which the counter reverse gear 54 is connected to the counter shaft Sc by means of the chamfer 56, the rotation of the main shaft Sm is transmitted to the driven wheels WR and WL through the clutch outer 35 and the clutch inner 49 of the fifth speed-reverse clutch C5R, the main reverse gear 51, the reverse idler gear 55, the counter reverse gear 54, the counter shaft Sc, the final drive gear 24, the final driven gear 26 and the differential gear box 25.

The gear train comprising the sub-shaft drive first gear 31 to the sub-shaft drive fourth gear 34 for transmitting the driving force of the main shaft Sm to the first sub-shaft Ss1 and the second sub-shaft Ss2 is placed along an almost central region in the axial direction of the main shaft Sm, the counter shaft Sc, the first sub-shaft Ss1 and the second sub-shaft Ss2, the second speed clutch C2 and the third speed clutch C3 are placed on the right-hand side of the above-mentioned gear train so as to be aligned with each other in a direction perpendicular to the shafts, and the fourth speed clutch C4 and the fifth speed-reverse clutch C5R that are placed back-to-back and the first speed clutch C1 are placed on the left-hand side of the gear train so as to be aligned with each other in a direction perpendicular to the shafts. Therefore, none of the clutches independently projects in the axial direction so reducing the overall axial length of the automatic transmission T.

Since the sub-shaft drive first gear 31 provided on the main shaft Sm is used for transmitting power to the first sub-shaft Ss1 as well as for transmitting power to the second sub-shaft Ss2, the number of gears on the main shaft Sm can be reduced so reducing the overall axial length of the automatic transmission T. Since the main third speed-fourth speed gear 48 provided on the main shaft Sm is used for establishing the third speed gear shift stage by disengaging the fourth speed clutch C4 as well as for establishing the fourth speed gear shift stage by engaging the fourth speed clutch C4, the number of gears on the main shaft Sm can be reduced so reducing the overall axial length of the automatic transmission T.

Figure 6:
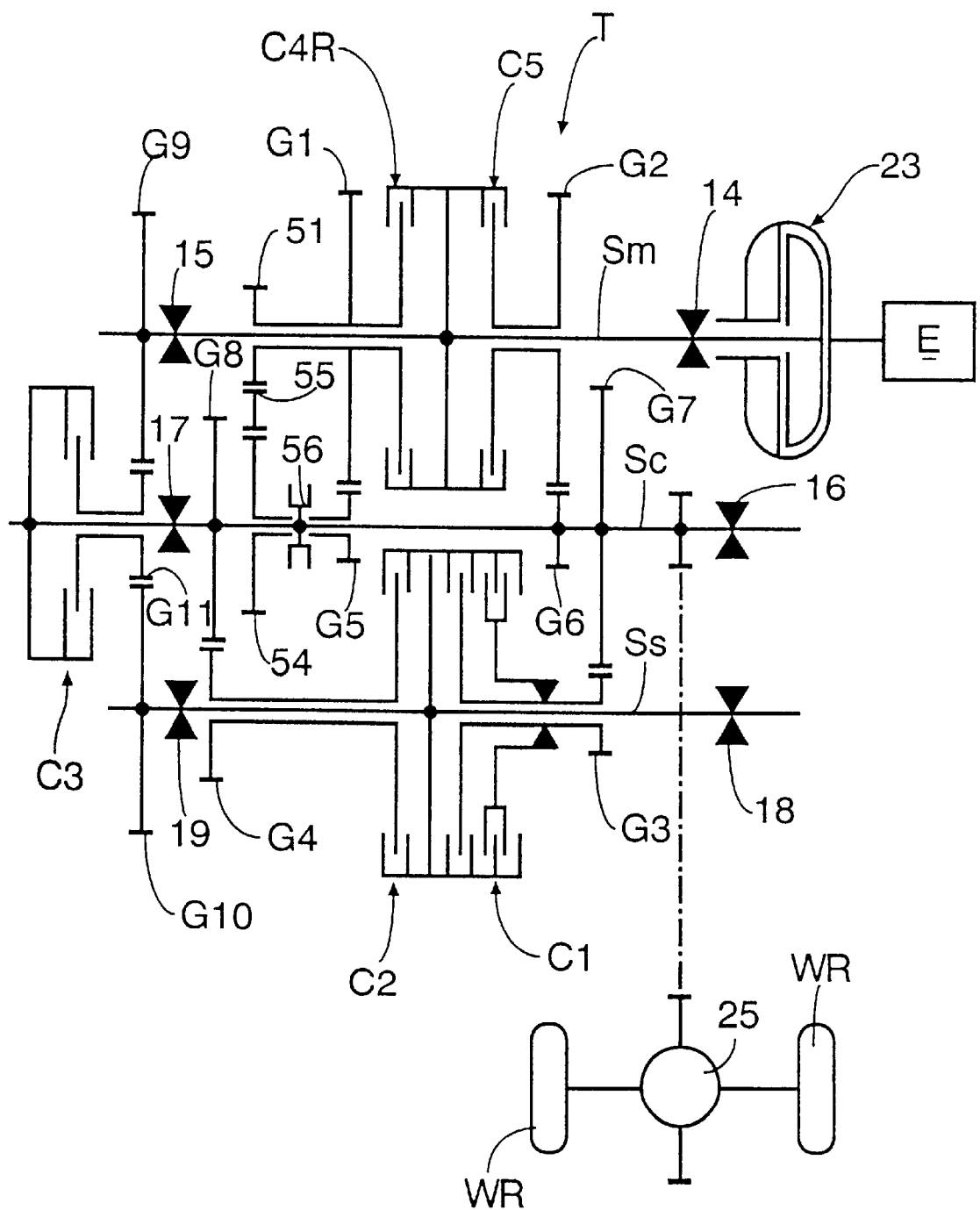
FIG. 6 is a schematic diagram of the automatic transmission of the art.

FIGS. 5A and 5B schematically illustrate a part of the conventional automatic transmission T shown in FIG. 6 and a part of the automatic transmission T of the present embodiment shown in FIG. 1 respectively.

With regard to the conventional automatic transmission T shown in FIG. 5A, the route for transmitting the driving force from the main shaft Sm to the counter shaft Sc in the first speed gear shift stage comprises the ninth gear G9, the eleventh gear G11, the tenth gear G10, the third gear G3 and the seventh gear G7, and the route for transmitting the driving force from the main shaft Sm to the counter shaft Sc in the second speed gear shift stage comprises the ninth gear G9, the eleventh gear G11, the tenth gear G10, the fourth gear G4 and the eighth gear G8.

In this case, the tenth gear G10 of the secondary shaft Ss is placed on the left-hand side of the bearing 19, the fourth gear G4 and the third gear G3 are placed on the right-hand side of the bearing 19, and the third gear G3 for the first speed gear shift stage is placed particularly far away on the right-hand side from the bearing 19. Therefore, each of the counter shaft Sc and the secondary shaft Ss greatly differs in curvature when the first speed gear shift stage is established and when the second speed gear shift stage is established; in particular, the angle α1 through which the tenth gear G10 of the secondary shaft Ss swings becomes extremely large, it becomes difficult for each of the gears to mesh with each other uniformly and it is hard to maintain the precision of the gears.

On the other hand, with regard to the automatic transmission T of the present embodiment shown in FIG. 5B, the route for transmitting the driving force from the main shaft Sm to the counter shaft Sc in the first speed gear shift stage comprises the sub-shaft drive first gear 31, the sub-shaft drive second gear 32, the sub-shaft drive third gear 33, the first sub first speed gear 40 and the counter first speed gear 41, and the route for transmitting the driving force from the main shaft Sm to the counter shaft Sc in the second speed gear shift stage comprises the sub-shaft drive first gear 31, the sub-shaft drive second gear 32, the sub-shaft drive third gear 33, the first sub second speed gear 43 and the counter second speed gear 44.

In this case, the first sub first speed gear 40 and the first sub second speed gear 43 of the first sub-shaft Ss1 are placed so as to adjoin the sub-shaft drive third gear 33 on either side thereof, the sub-shaft drive third gear 33 being positioned in an almost central part of the first sub-shaft Ss1. The counter shaft Sc and the secondary shaft Ss are therefore slightly curved in the same direction when first speed gear shift stage and the second speed gear shift stage are established, the angle α2 through which the sub-shaft drive third gear 33 of the first sub-shaft Ss1 swings becomes small, the sub-shaft drive third gear 33 swinging to the greatest extent, and each of the gears can therefore be maintained meshed with each other in a desirable manner so reducing the gear noise.

An embodiment of the present invention has been described in detail above, but the present invention can be modified in a variety of ways without departing from the spirit and scope of the invention.

For example, the embodiment illustrates a five forward speed automatic transmission T, but the present invention can be applied to a four forward speed automatic transmission T.

EFFECTS OF THE INVENTION

As described above, in accordance with the first characteristic of the invention, the first gear provided on the main shaft for transmitting the rotation of the main shaft to the counter shaft via the second route and the third gear provided on the second sub-shaft for transmitting the rotation of the main shaft to the counter shaft via the third route are provided within a first plane extending in a direction perpendicular to the shafts, the second gear provided on the main shaft for transmitting the rotation of the main shaft to the counter shaft via the first route and the fourth gear supported on the second sub-shaft for transmitting the rotation of the main shaft to the counter shaft via the third route are provided within a second plane extending in a direction perpendicular to the shafts. Therefore, the first gear of the main shaft can be used for transmitting power via both the second route and the third route and the second gear of the main shaft can be used for transmitting power via both the first route and the third route so reducing the number of gears and the axial length of the automatic transmission.

In accordance with the second characteristic of the invention, in addition to the effect of the first characteristic, since the first gear fixed to the main shaft is meshed with the third gear provided on the second sub-shaft in a manner such that the third gear can be freely engaged and disengaged, and the second gear provided on the main shaft in a manner such that the second gear can be freely engaged and disengaged is meshed with the fourth gear fixed on the second sub-shaft. Therefore, connecting the third gear to the second sub-shaft can establish a gear shift stage via the third route, and connecting the fourth gear to the main shaft can establish a gear shift stage via the first route.

In accordance with the third characteristic of the invention, since the second gear provided on the main shaft in a manner such that the second gear can be freely engaged and disengaged is also used as the idler gear provided in the third route for transmitting the rotation of the main shaft to the counter shaft via the second sub-shaft, the number of gears can be further decreased so further reducing the axial length of the automatic transmission.

In accordance with the fourth characteristic of the invention, the driving force of the main shaft is transmitted to the first sub-shaft and the second sub-shaft via the gear train, one of the two low speed clutches and the high speed clutches are placed on one side of the gear train so that the low speed clutch and the high speed clutches are aligned with each other in a direction perpendicular to the shafts, and the other low speed clutch and the medium speed clutch are placed on the other side of the gear train so that the low speed clutch and the medium speed clutch are aligned with each other in a direction perpendicular to the shafts. Therefore, the overall axial length of the low, medium and high speed clutches can be shortened so reducing the size of the automatic transmission.

In accordance with the fifth characteristic of the invention, when a first speed gear shift stage is established, the driving force is transmitted via the gear in the gear train placed on an almost central part of the first sub-shaft, the two ends of the first sub-shaft being supported, and the first gear adjoining one side of the above-mentioned gear; when a second speed gear shift stage is established, the driving force is transmitted via the gear in the above-mentioned gear train and the second gear adjoining the other side of the above-mentioned gear. Therefore, the curvature of the first sub-shaft accompanying the transmission of the driving force can be minimised so avoiding incomplete gear meshing and reducing the noise.

In accordance with sixth characteristic of the invention, when the medium speed clutch is engaged, the rotation of the second sub-shaft is transmitted to the counter shaft via the medium speed gears, when the high speed clutch is engaged, the rotation of the main shaft is transmitted to the counter shaft via the medium speed gears that are also used as the high speed gears. Therefore, the number of gears can be decreased so contributing to a reduction in the size of the automatic transmission.

An embodiment of the present invention has been described in detail above, but the present invention can be modified in a variety of ways without departing from the spirit and scope of the invention.

For example, the embodiment illustrates a five forward speed automatic transmission T, but the present invention can be applied to a four forward speed automatic transmission T.

I claim:

1. An automatic transmission having four parallel shafts comprising, in parallel,:
   a main shaft,
   a counter shaft to which the rotation of the main shaft is directly transmitted via a first route, a first sub-shaft provided on a second route through which the rotation of the main shaft is transmitted to the counter shaft, and a second sub-shaft provided on a third route through which the rotation of the main shaft is transmitted to the counter shaft, wherein a first gear for transmitting the rotation of the main shaft to the counter shaft via the second route and a second gear for transmitting the rotation of the main shaft to the counter shaft via the first route are provided on the main shaft, a third gear and a fourth gear for transmitting the rotation of the main shaft to the counter shaft via the third route are provided on the second sub-shaft, the first gear fixed to the main shaft is meshed with the third gear provided on the second sub-shaft in a manner such that the third gear can be freely engaged and disengaged, and the second gear provided on the main shaft in a manner such that the second gear can be freely engaged and disengaged is meshed with the fourth gear fixed on the second sub-shaft.

2. The automatic transmission according to claim 1 wherein the second gear provided on the main shaft in a manner such that the second gear can be freely engaged and disengaged is also used as an idler gear provided on the third route for transmitting the rotation of the main shaft to the counter shaft via the second sub-shaft.

3. An automatic transmission having four parallel shafts comprising, in parallel,:

a main shaft connected to an engine, a counter shaft connected to driven wheels, a first sub-shaft and second sub-shaft to which the drive force of the main shaft is transmitted via a gear train, two low speed clutches for transmitting the rotation of the first sub-shaft to the counter shaft being provided on the first sub-shaft, a medium speed clutch for transmitting the rotation of the main shaft to the second sub-shaft being provided on the second sub-shaft, and high speed clutches for transmitting the rotation of the main shaft to the counter shaft being provided on the main shaft, wherein one of the low speed clutches and the high speed clutches is placed on one side of the gear train so that the low speed clutch and the high speed clutches are aligned with each other in a direction perpendicular to the shafts, and the other low speed clutch and the medium speed clutch are placed on the other side of the gear train so that the low speed clutch and the medium speed clutch are aligned with each other in a direction perpendicular to the shafts.

4. The automatic transmission according to claim 3, wherein a gear included in the gear train is placed on an almost central part of the first sub-shaft, opposite ends of the first sub-shaft being supported by bearings, and a first speed gear for establishing a first speed gear shift stage and a second speed gear for establishing a second gear shaft stage are placed on either side of the gear so as to adjoin the gear.

5. The automatic transmission according to claim 3, wherein medium speed gear for transmitting the rotation of the second sub-shaft to the counter shaft by engagement of the medium speed clutch are also used as high speed gears for transmitting the rotation of the main shaft to the counter shaft by engagement of one of the high speed clutches.

* * * * *